United States Patent
Al-Qutub et al.

(10) Patent No.: US 10,472,258 B2
(45) Date of Patent: Nov. 12, 2019

(54) THERMAL ENERGY-DRIVEN MECHANICAL COMPRESSION HUMIDIFICATION-DEHUMIDIFICATION WATER PURIFICATION

(71) Applicants: Massachusetts Institute of Technology, Cambridge, MA (US); King Fahd University of Petroleum & Minerals, Dhahran (SA)

(72) Inventors: Amro Al-Qutub, Dhahran (SA); Prakash Narayan Govindan, Melrose, MA (US); John H. Lienhard, Lexington, MA (US)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 128 days.

(21) Appl. No.: 15/323,376

(22) PCT Filed: Jun. 29, 2015

(86) PCT No.: PCT/US2015/038337
§ 371 (c)(1),
(2) Date: Dec. 30, 2016

(87) PCT Pub. No.: WO2016/003913
PCT Pub. Date: Jan. 7, 2016

(65) Prior Publication Data
US 2017/0152156 A1 Jun. 1, 2017

Related U.S. Application Data

(60) Provisional application No. 62/018,784, filed on Jun. 30, 2014.

(51) Int. Cl.
*C02F 1/10* (2006.01)
*C02F 1/04* (2006.01)
(Continued)

(52) U.S. Cl.
CPC .................. *C02F 1/10* (2013.01); *B01D 1/28* (2013.01); *B01D 3/346* (2013.01); *B01D 5/006* (2013.01);
(Continued)

(58) Field of Classification Search
CPC .......... B01D 1/28; B01D 3/346; B01D 5/006; C02F 1/04; C02F 1/041; C02F 1/10; C02F 2103/08
See application file for complete search history.

(56) References Cited

U.S. PATENT DOCUMENTS 3,879,266 A * 4/1975 Sorensen ................. B01D 1/02
202/236
4,035,243 A * 7/1977 Katz .................... B01D 1/2884
203/24
(Continued)

*Primary Examiner* — Youngsul Jeong
*Assistant Examiner* — Gabriel E Gitman
(74) *Attorney, Agent, or Firm* — Modern Times Legal; Robert J. Sayre

(57) ABSTRACT

A carrier gas is directed through a humidification chamber in a humidifier, where the carrier gas flow is directly contacted with a feed liquid to humidify the carrier gas with water evaporated from the feed liquid, producing a humidified gas flow. The humidified gas flow is then compressed in a compressor and then directed through a dehumidification chamber in a dehumidifier, where the compressed humidified gas flow is dehumidified to condense water from the compressed humidified gas flow. The dehumidified gas flow is then expanded in an expander, wherein the expansion of the dehumidified gas flow generates motion (e.g., rotation of a shaft), and wherein the motion generated in the expander is transferred to the compressor, where the motion com- (Continued)

presses the humidified gas flow. Heat is also removed from the expanded dehumidified gas flow and transferred to compressed dehumidified gas flow upstream from the expander.

11 Claims, 3 Drawing Sheets

(51) Int. Cl.
    *B01D 1/28*     (2006.01)
    *B01D 3/34*     (2006.01)
    *B01D 5/00*     (2006.01)
    *C02F 103/08*     (2006.01)

(52) U.S. Cl.
    CPC ............... *C02F 1/04* (2013.01); *C02F 1/041* (2013.01); *C02F 2103/08* (2013.01)

(56) References Cited

U.S. PATENT DOCUMENTS

| | | | |
|---|---|---|---|
| 6,382,310 B1* | 5/2002 | Smith | F28B 1/06 |
| | | | 165/121 |
| 8,252,092 B2 | 8/2012 | Govindan et al. | |
| 8,469,234 B1 | 6/2013 | Loomis | |
| 8,647,477 B2 | 2/2014 | Govindan et al. | |
| 2005/0126175 A1* | 6/2005 | Badgley | F01C 11/004 |
| | | | 60/772 |
| 2007/0256430 A1* | 11/2007 | Prueitt | B01D 5/006 |
| | | | 62/93 |
| 2011/0079504 A1* | 4/2011 | Govindan | B01D 1/14 |
| | | | 203/11 |
| 2012/0205236 A1* | 8/2012 | Govindan | B01D 1/14 |
| | | | 203/11 |

* cited by examiner

THERMAL ENERGY-DRIVEN MECHANICAL COMPRESSION HUMIDIFICATION-DEHUMIDIFICATION WATER PURIFICATION

BACKGROUND

In this century, the shortage of fresh water may well surpass the shortage of energy as a global concern for humanity; and these two challenges are inexorably linked, as explained, for example, in the "Special Report on Water" in the 20 May 2010 issue of *The Economist*. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

Additionally, water can be advantageously extracted from contaminated waste streams (e.g., from oil and gas production) both to produce fresh water and to concentrate and reduce the volume of the waste streams, thereby reducing pollution and contamination and reducing costs.

Nevertheless, many of the existing processes for producing fresh water from seawater (or from brackish water or contaminated waste streams) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulphate, magnesium hydroxide and calcium carbonate precipitation, which leads to the formation of soft and hard scale on the heat transfer equipment.

Humidification-dehumidification (HDH) desalination systems include a humidifier and a dehumidifier as their main components and use a carrier gas (e.g., air) to communicate energy between the heat source and the brine. A simple version of this technology includes a humidifier, a dehumidifier, and a heater to heat the seawater stream. In the humidifier, hot seawater comes in direct contact with dry air, and this air becomes heated and humidified. In the dehumidifier, the heated and humidified air is brought into (indirect) contact with cold seawater and gets dehumidified, producing pure water and dehumidified air. As with MSF and MED systems, precipitation of scaling components can occur within the system with consequent damage if the temperature rises too high.

Another approach, described in U.S. Pat. No. 8,119,007 B2 (A. Bajpayee, et al.), uses directional solvent that directionally dissolves water but does not dissolve salt. The directional solvent is heated to dissolve water from a salt solution into the directional solvent. The remaining highly concentrated salt water is removed, and the solution of directional solvent and water is cooled to precipitate substantially pure water out of the solution.

Some of the present inventors were also named as inventors on the following patents that include additional discussion of humidification-dehumidification and other processes for purifying water: U.S. Pat. No. 8,292,272 B2; U.S. Pat. No. 8,465,006 B2; U.S. Pat. No. 8,252,092 B2; U.S. Pat. No. 8,647,477 B2; U.S. Pat. No. 8,523,985 B2; and U.S. Pat. No. 8,496,234 B1.

SUMMARY

Methods and apparatus for purifying water via thermal-energy-driven mechanical compression humidification-dehumidification are described herein. Various embodiments of the methods and apparatus may include some or all of the elements, features and steps described below.

In an example of the method, a flow of a carrier gas is directed through a humidification chamber in at least one humidifier. The carrier gas flow is directly contacted with a feed liquid in the humidification chamber to humidify the carrier gas with water evaporated from the feed liquid, producing a humidified gas flow. The humidified gas flow is then compressed in a compressor. The compressed humidified gas flow is then directed through a dehumidification chamber in at least one dehumidifier, where the compressed humidified gas flow is dehumidified to condense water from the compressed humidified gas flow. The compressed dehumidified gas flow is then expanded in an expander, wherein the expansion of the dehumidified gas flow generates motion (e.g., rotation of a shaft), and wherein the motion generated in the expander is transferred to the compressor via a mechanical connection, where the motion compresses the humidified gas flow. Next, heat is removed from the expanded dehumidified gas flow after leaving the expander; and that heat is transferred from the expanded dehumidified gas flow to compressed dehumidified gas flow after leaving the dehumidification chamber but before entering the expander.

The methods and apparatus described herein can be used to separate pure water from a feed liquid (including but not limited to seawater, brackish water, and waste water) in a cost-efficient manner. In particular embodiments, the methods and apparatus described herein can be incorporated into the apparatus and methods disclosed in U.S. Pat. No. 8,252,092 B2 to increase the energy efficiency of the apparatus and methods.

The apparatus and methods described herein can produce a gain output ratio (GOR) of 7; and the lower energy costs that can be achieved with these methods and apparatus make the methods and apparatus suitable for the distributed drinking water market. The methods and apparatus can be used for the desalination of seawater and other forms of water purification and extraction both for drinking water and for produced and flowback water from shale gas/oil hydraulic fracturing (fracking) water markets.

Figure 1:
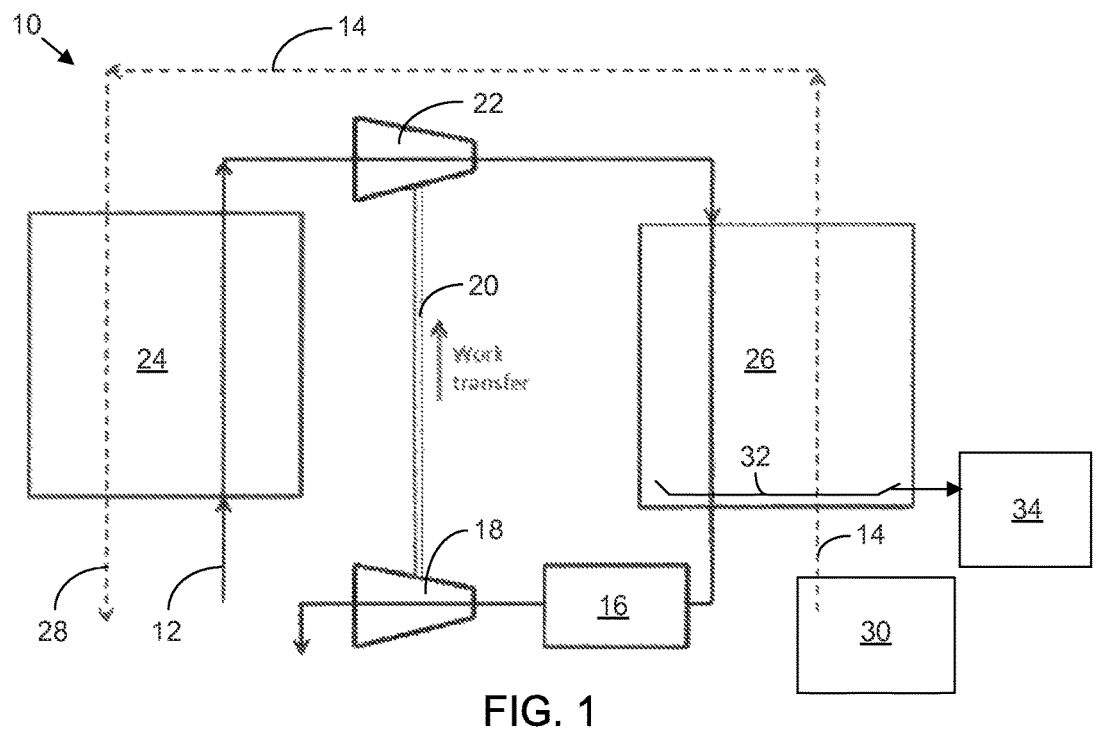
FIG. 1 is a schematic illustration of a thermal-energy-driven varied-pressure humidification-dehumidification system 10.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

A humidification-dehumidification (HDH) cycle involves the humidification of a carrier gas (e.g., selected from air, nitrogen, etc.) by a feed liquid that includes water followed by the dehumidification of the humidified carrier gas to release pure water.

The separation of the humidification and dehumidification functions into distinct components in a humidification-dehumidification apparatus can reduce thermal inefficiencies and improve overall performance. For example, recovery of the latent heat of condensation in the humidification-dehumidification process is affected in a separate heat exchanger (i.e., the dehumidifier) in which the seawater, for example, can be preheated. The humidification-dehumidification process thus can provide higher productivity due to the separation of the basic processes.

Using the apparatus, described below, the principle of humidification-dehumidification of a carrier gas is utilized to separate water from a feed liquid. The feed liquid can be in the form of a solution with dissolved components, such as salts, and/or a mixture containing solids and/or other liquids. The process is herein described in the context, for example, of water desalination, where pure water is separated from salt water, though the process and apparatus can likewise be utilized in the context of separating water from other feed liquids.

The water separation process, described herein, works on a humidification-dehumidification principle. A carrier gas (selected, e.g., from air, nitrogen, etc.) that has the ability to carry water vapor is used as a medium for separating substantially pure water from a feed liquid (e.g., seawater, brackish water, etc.) and is driven through the system 10 (as shown in the FIGURES) via conduits containing variable-frequency-control fans. The water component of the feed liquid is evaporated into the carrier gas by means of a humidification process. The carrier gas is saturated with water vapor in the humidifier 24. The moisture-laden, low-pressure carrier gas is then compressed to a higher pressure in a compressor 22 and sent to a dehumidifier 26 that condenses out the water from the gas. The dehumidification process also results in heating of the feed liquid that is eventually used to irrigate the humidifier 24.

The carrier gas thus undergoes the humidification process at a lower pressure and the dehumidification process at a higher pressure. The pressure ratio (i.e., the ratio of the absolute pressure in the dehumidification chamber to the absolute pressure in the humidification chamber) can be, for example, above 1.1, including, e.g., 1.6 or 2 or another value. This pressure differential creates an opportunity for greater heat recovery for the following reasons: (1) the heat recovered in the dehumidifier 26 from the carrier gas to pre-heat the feed liquid is of higher grade (higher temperature), and (2) the carrier gas, itself, gets heated (apart from getting humidified) in the humidifier 24 by virtue of being at a lower temperature than the feed liquid. The average-temperature difference between the chambers can be at least 4° C., for example, in the range from 10° to 70° C. (with the average temperature in the dehumidification chamber being higher than the average temperature in the humidification chamber).

Accordingly, the energy for the cycle is input into the carrier gas after humidification in the form of compression, and the carrier gas is then dehumidified. The carrier gas after dehumidification can be expanded by an expander 18 to a lower pressure; and a part of the compressor work can be supplied by the work extracted from the expansion process, for example, by coupling the expander 18 to the same shaft 20 as the compressor 22 or by using a motor-generator arrangement to transfer the expander work to the compressor 22. Also the differentiation of pressure raises the humidity in the carrier gas at the exit of the humidifier 24 and lowers the humidity in the carrier gas upon exiting the dehumidifier 26, thereby increasing the production of substantially pure water. Cooling of the carrier gas via expansion en route to the humidifier 24 results in a lower temperature in the humidifier 24, which also improves the performance of the cycle.

The energy efficiency of a humidification-dehumidification system 10 depends on the amount of energy recovered from the condensation process (dehumidification) to the evaporation process (humidification). With higher energy recovery, less energy input is needed to sustain the water-separation process. In U.S. Pat. No. 8,252,092 B2, we described a method to increase the energy recovery by varying the pressure between the dehumidification and humidification processes. Herein, we describe (a) a method and a system 10 to drive the varied pressure process by (mostly) thermal energy; (b) specific embodiments of the compression and the expansion apparatus that can be used to manufacture the system 10 at low cost and high system efficiency; and (c) a method for optimally recovering and reusing the energy input within the system 10.

Figure 2:
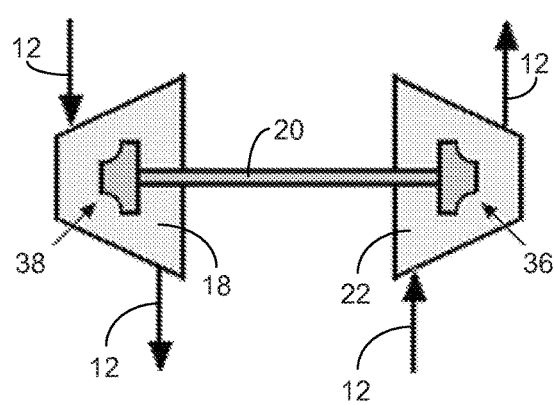
FIG. 2 is a schematic illustration of a compressor 22 and expander 18 driven by a shared rotating shaft 20.

A first embodiment of a thermal-energy-driven varied-pressure humidification-dehumidification system 10 is illustrated in FIG. 1, wherein the carrier-gas and feed-liquid streams (shown with arrows) are directed, respectively, through sealed carrier-gas conduits 12 and through sealed feed-liquid conduits 14. The carrier gas (e.g., air) is heated by a heater 16 (e.g., in the form of a low-cost gasoline or diesel burner or a heat-exchanger in a closed-cycle carrier-gas-flow system) to a relatively high temperature of about 250° C. or higher in the heater 16. In other embodiments (where the carrier gas is discharged after expansion), heating may be provided directly by burning fuel in the carrier gas stream. The heat added to the carrier-gas stream is used to produce work in an expander 18 that shares a rotating shaft 20 with a compressor 22, thus providing all of the work required to drive the system 10. I.e., as the carrier gas passes through the expander 18, the expanding gas spins the shaft 20 and that rotation is transferred to the compressor 22 to compress the carrier gas on the other side of the circuit. Use of a shared rotating shaft 20 by the expander 18 and the compressor 22 (or, alternatively, the transfer of that rotation via inter-meshed gears or other connecting structures) helps avoid the complications of driving the compressor-expander assembly via an electric motor. In particular embodiments, the compressor 22, which includes a compressor wheel 36, and the expander 18, which includes an expander wheel 38 can be configured in the form of a turbo-expander with the expander 18 on one end of the shaft 20 and with the compressor 22 on the opposite end of the shaft 20, as shown in FIG. 2.

In various embodiments, the displacement from the expander 18 can be transferred to generate displacement in the compressor 22 not just by a rotating shaft but, alternatively or in addition, by other forms of mechanical connection 20, such as a belt, gears, etc. In other embodiments, the expanding gas can generate another form of motion (e.g., linear displacement) that is transferred to the compressor 22 to compress the humidified carrier gas therein. Moreover, in additional embodiments, any type of positive displacement and/or turbomachinery may be used to transfer the work of expansion in the expander 18 to provide compression in the compressor 22.

If the carrier gas is infused with combustion products in the heater 16, the carrier gas can be released after passing through the expander 18. If, however, the heater 16 that heats the carrier gas is, e.g., a heat exchanger or other type of heater that does not contaminate the carrier gas with combustion products, then the carrier gas can be circulated and reused in the system 10 via a closed loop, wherein a section of carrier-gas conduit 12 directs the carrier gas back into the bottom of the humidifier 24 from the expander 18 (rather than releasing the carrier gas after expansion).

The humidification chamber can be filled with a packing material in the form, e.g., of polyvinyl chloride (PVC) packing to facilitate turbulent gas flow and to increase the liquid surface area that is in contact with the carrier gas. The body of the humidifier 24 (and the dehumidifier 26) can be formed, e.g., of stainless steel and is substantially vapor impermeable; seals formed, e.g., of epoxy sealant, gaskets, O-rings, welding or similar techniques, are provided at the vapor and water inputs and outputs of the humidifier 24 and at the interfaces of each modular component and adjoining conduits to maintain vacuum in the system 10. In one embodiment, the humidification chamber is substantially cylindrical with a height of about 1.5 m and a radius of about 0.25 m.

The humidifier 24 and dehumidifier 26 are of a modular construction (i.e., separate parts) and are substantially thermally separated from one another. The characterization of the humidifier 24 and dehumidifier 26 as being "substantially thermally separated" is to be understood as being structured for little or no direct conductive heat transfer through the apparatus between the humidification and dehumidification chambers, though this characterization does not preclude the transfer of thermal energy via gas and/or liquid flow between the chambers. This "substantial thermal separation" characterization thereby distinguishes the apparatus from, e.g., a dewvaporation apparatus, which includes a shared heat-transfer wall between the humidifier and the dehumidifier. In the apparatus of this disclosure, the humidifier 24 and dehumidifier 26 do not share any common walls that would facilitate conductive heat transfer therebetween.

Instead, thermal energy is transferred between the chambers mostly via mass flow of the gas and liquid. The gas is humidified in the humidification chamber of the humidifier 24 using the hot impure water (i.e., the feed liquid—for example, in the form of an aqueous saline solution from the ocean or from a tank), which is sprayed from one or more nozzles at the top of the humidifier 24, while the gas moves in a counter-flow direction (up through the humidification chamber, as shown), thereby substantially increasing the water vapor content in the gas (e.g., increasing the water vapor content by at least 50%) via evaporation of water (e.g., about 5 to 10% of the water) from the liquid composition into the carrier gas flow. The remaining (brine) portion of the liquid composition (that which is not evaporated in the humidification chamber) pools at the bottom of the humidifier chamber and drains through a feed-liquid output conduit 28.

The humidified carrier gas, after leaving the humidifier 24, is directed from the compressor 22 to the dehumidifier 26, where the carrier gas is dehumidified in a dehumidification chamber using the cold inlet feed liquid pumped by a water pump through a feed-liquid input conduit 14 that draws the feed liquid from the feed-liquid reservoir 30, which may be a seawater source, to provide a substantially constant mass flow to and through a coiled feed-liquid conduit 14 inside the dehumidification chamber of the dehumidifier 26, allowing for thermal energy transfer from the gas to the feed liquid inside the dehumidifier 26. The water vapor in the gas therefore condenses and is collected as substantially pure water in a distillate collection tray 32 at the bottom of the dehumidification chamber. The collected pure water, can then be removed from the dehumidifier 26 to a storage tank 34 for use, e.g., as drinking water, for watering crops, for washing/cleaning, for cooking, etc.

Figure 3:
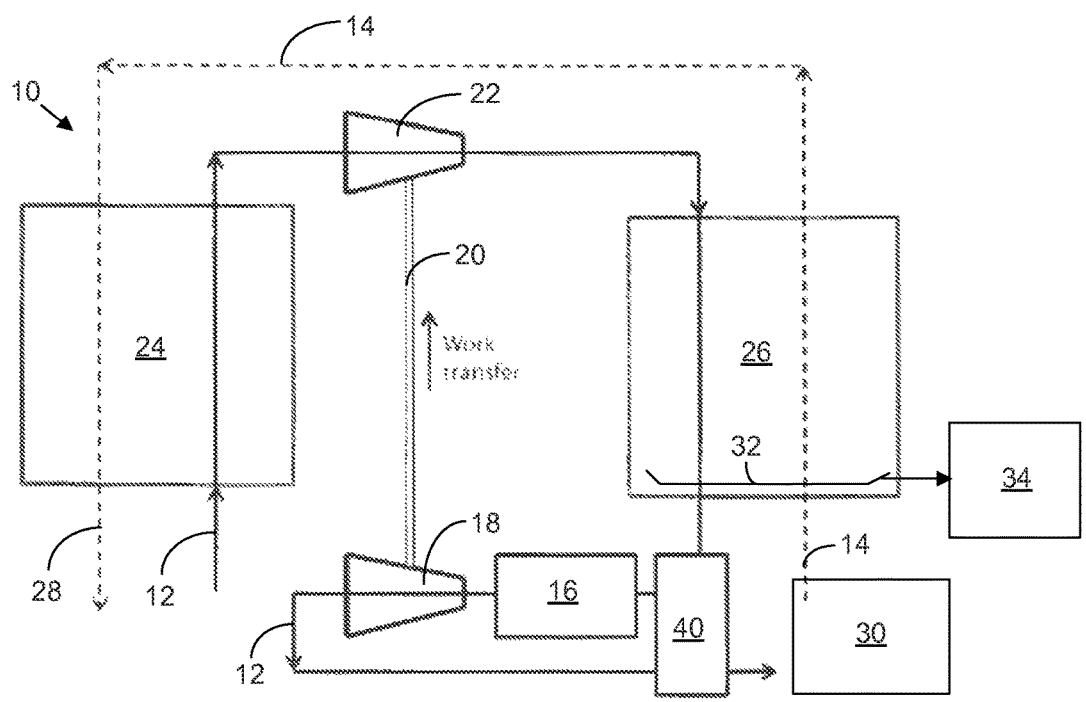
FIG. 3 is a schematic illustration of a thermal-energy-driven varied-pressure humidification-dehumidification system 10 with a carrier-gas pre-heater 40 for high system efficiency.

A system 10 with a carrier-gas pre-heater to increase the energy efficiency of the system 10 is shown in FIG. 3. The carrier gas is directed through the pre-heater 40, which acts as a heat exchanger, after the carrier gas exits the dehumidifier 26. The energy of the carrier-gas stream as it exits the expander 18 is recovered when the expanded carrier gas is directed back through the pre-heater 40, which serves as a heat recovery system, transferring the heat from the expanded carrier gas to heat the incoming carrier-gas stream from the dehumidifier 26.

Figure 4:
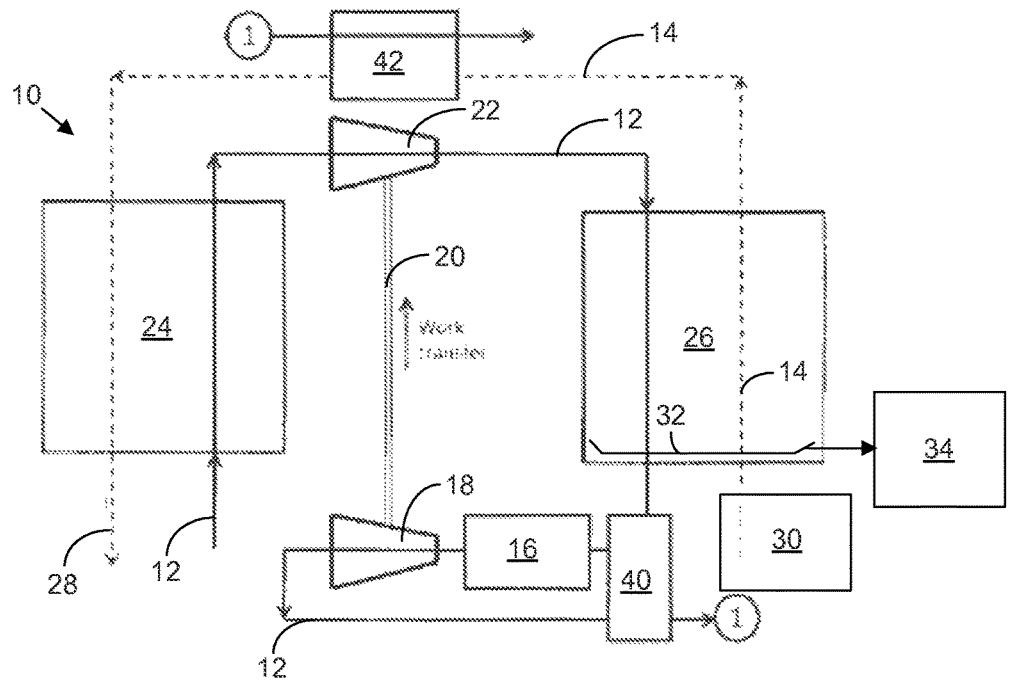
FIG. 4 is a schematic illustration of a thermal-energy-driven varied-pressure humidification-dehumidification system 10 with carrier-gas and feed-liquid pre-heaters 40 and 42 for high system efficiency.

Energy efficiencies of the current system 10 are further enhanced by using a pre-heater 42 for the feed liquid, as illustrated in FIG. 4, to heat the feed liquid (e.g., brine) before it enters the humidifier 24. In this embodiment, the feed-liquid pre-heater 42 is coupled with the feed-liquid conduit 14 directing feed liquid from the dehumidifier 26 to the humidifier 24; and the carrier gas is extracted from the carrier-gas pre-heater 40 at (1) and directed through the feed-liquid pre-heater 42 where remaining heat in the extracted carrier gas is transferred to the feed liquid after warming the feed liquid in the humidifier 24. This heat transfer helps to also increase the humidity levels and the water productivity of this system 10.

Figure 5:
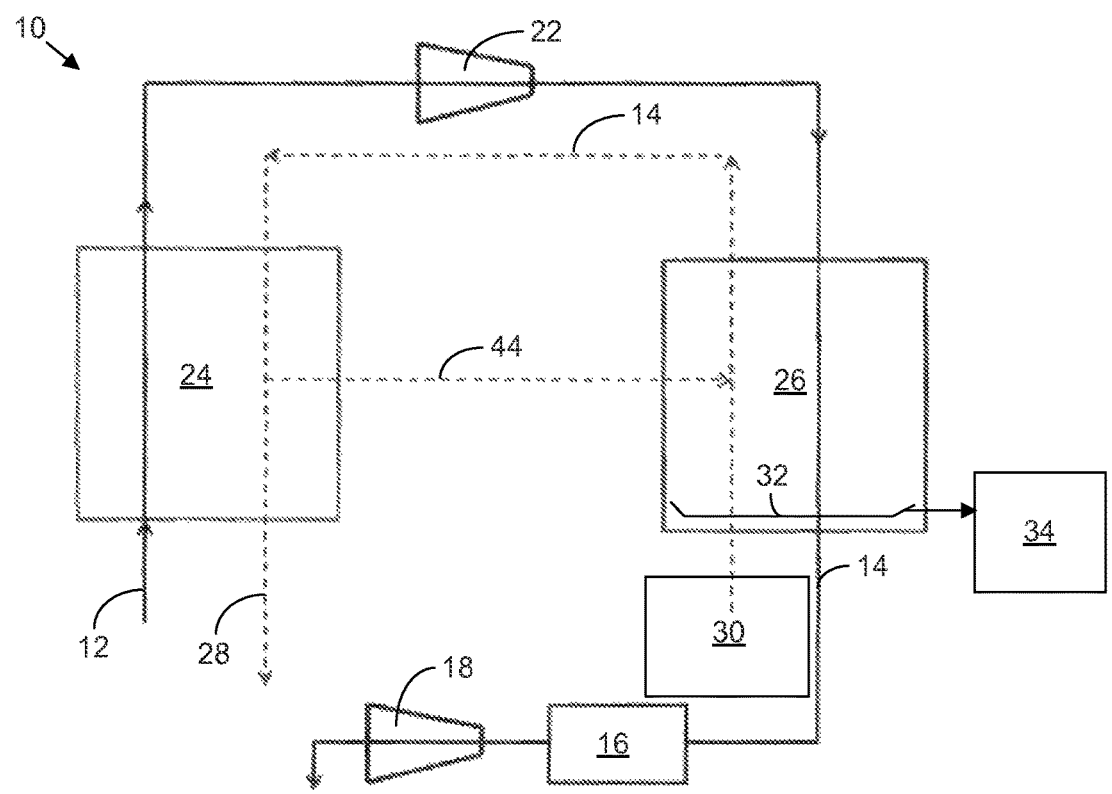
FIG. 5 is a schematic illustration of a varied-pressure humidification-dehumidification system 10 with water extraction for high system efficiency.

Thermal balancing to enhance the energy efficiency of the humidification-dehumidification system is described in U.S. Pat. No. 8,496,234 B1. Thermal balancing via intermediate extraction of fluids can be particularly advantageous in conjunction with the methods and apparatus described herein. Specifically, variation of the mass flow rate of sea water (or another feed liquid including water as a constituent) along the process path of the humidifier 24 and the dehumidifier 26 can be used to enhance the efficiency of the system 10 by a twofold increase. An embodiment of such a system 10 (without the shared shaft shown) is illustrated in FIG. 5, wherein feed liquid is extracted via an intermediate exchange conduit 44 from an intermediate location in the humidifier 24 and injected via a conduit into an intermediate location in the dehumidifier 26.

This intermediate extraction can balance the driving thermodynamic potential (i.e., local temperature and/or concentration differences) along the fluid-flow path of a humidifier 24 and/or dehumidifier 26 to reduce the entropy generated in HDH systems. This balancing can, in turn, increase the heat recovered from the dehumidifier 26 to the humidifier 24 and can reduce the energy consumed per unit amount of water desalinated. The design draws upon the fundamental observation that there is a single value of the water-to-air mass flow rate ratio (for any given boundary conditions and component effectiveness or fixed hardware configuration) at which the system 10 performs optimally.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for purifying water via thermal-energy-driven mechanical compression humidification-dehumidification, comprising:
   directing a flow of a feed liquid into a feed-liquid input and out of a feed-liquid output for a humidification chamber in at least one humidifier;
   directing a flow of a carrier gas into a carrier-gas input and out of a carrier-gas output for the humidification chamber in the at least one humidifier;
   directly contacting the carrier gas flow with the feed liquid in the humidification chamber to humidify the carrier gas with water evaporated from the feed liquid, producing a humidified gas flow;
   directing the humidified gas flow through a humidified-carrier-gas conduit to a carrier-gas input for a dehumidification chamber in at least one dehumidifier;
   compressing the humidified gas flow in a compressor in or coupled with the humidified-carrier-gas conduit;
   directing the compressed humidified gas flow into the carrier-gas input and out of a carrier-gas output for the dehumidification chamber in the at least one dehumidifier;
   dehumidifying the compressed humidified gas flow in the dehumidification chamber to condense purified water from the compressed humidified gas flow; then
   directing the dehumidified compressed gas flow from the carrier-gas output of the dehumidifier through a dehumidified-carrier-gas conduit;
   using a heater to heat the dehumidified compressed gas flow in the dehumidified-carrier-gas conduit;
   expanding the heated and dehumidified compressed gas flow in an expander in or coupled with the dehumidified-carrier-gas conduit, wherein the expansion of the heated and dehumidified gas flow generates motion, and wherein the motion generated in the expander is transferred to the compressor via a mechanical connection, where the compressor uses the transferred motion to compress the humidified gas flow; then
   using a heat recovery system to extract heat from expanded dehumidified gas flow after leaving the expander;
   using the heat recovery system to transfer the heat extracted from expanded dehumidified gas flow to the dehumidified compressed gas flow in the dehumidified-carrier-gas conduit after the dehumidified compressed gas flow leaves the dehumidification chamber but before the dehumidified compressed gas flow enters the expander; and
   releasing an expanded gas flow without closed-loop recycling of the released gas flow through the above steps.

2. The method of claim 1, wherein the motion is a rotation.

3. The method of claim 2, wherein the rotation is transferred from the expander to the compressor via the mechanical connection, the mechanical connection being a shared shaft rotated by the expansion of the dehumidified gas flow in the expander.

4. The method of claim 1, further comprising flowing the feed liquid through the at least one dehumidifier before introducing the feed liquid into the at least one humidifier, wherein the compressed humidified gas flow is dehumidified by transferring heat from the compressed humidified gas flow to the feed liquid in the at least one dehumidifier.

5. The method of claim 1, further comprising heating the feed liquid en route to the at least one humidifier from the at least one dehumidifier with heat transferred from the expanded dehumidified gas flow after the expanded gas flow transfers heat to the dehumidified compressed gas flow.

6. The method of claim 4, further comprising extracting feed liquid from an intermediate stage in the at least one humidifier and injecting the extracted feed liquid into the feed liquid flowing through the at least one dehumidifier at an intermediate stage in the at least one dehumidifier.

7. A system for purifying water via thermal-energy-driven mechanical compression humidification-dehumidification, comprising:
   a humidifier including a carrier-gas input and a carrier-gas output and a feed-liquid input and a feed-liquid output;
   a dehumidifier including a carrier-gas input and a carrier-gas output;
   a humidified-carrier-gas conduit coupling the carrier-gas output of the humidifier and the carrier-gas input of the dehumidifier for gas flow therebetween;
   a dehumidified-carrier-gas conduit coupled with the carrier-gas output of the dehumidifier;
   a compressor in or coupled with the humidified-carrier-gas conduit and configured to compress the carrier gas passing from the humidifier to the dehumidifier;
   an expander in or coupled with the dehumidified-carrier-gas conduit and configured to expand the carrier gas exiting the dehumidifier, wherein the expander is mechanically coupled with the compressor and is configured to generate motion with the expansion of the carrier gas and to transfer the motion to the compressor, and wherein the compressor is configured to compress the carrier gas via the transferred motion;
   a heater configured to heat dehumidified carrier gas in the dehumidified-carrier-gas conduit between the dehumidifier and the expander; and
   a heat recovery system configured to extract heat from carrier gas leaving the expander and to transfer the extracted heat to carrier gas in the dehumidified-carrier-gas conduit between the dehumidifier and the expander,
   wherein the system for purifying water is configured to release carrier gas without closed-loop recycling of the released carrier gas after the carrier-gas expansion in the expander.

8. The system of claim 7, wherein the expander is mechanically coupled with the compressor via a shaft configured for axial rotation.

9. The system of claim 7, further comprising pumps configured to flow carrier gas and feed liquid through the conduits.

10. The system of claim 7, further comprising:
    a feed-liquid conduit extending between the humidifier and the dehumidifier; and
    a heat exchanger configured to transfer heat from carrier gas in the dehumidified-carrier-gas conduit downstream from the expander to feed liquid in the feed-liquid conduit between the humidifier and the dehumidifier.

11. The system of claim 7, further comprising an intermediate exchange conduit extending between an intermediate stage in the humidifier and an intermediate stage in the dehumidifier and configured to extract feed liquid from the intermediate stage in the humidifier and to inject the extracted feed liquid into the intermediate stage of the dehumidifier.

\* \* \* \* \*